(12) United States Patent
Uetabira et al.

(10) Patent No.: US 12,513,281 B2
(45) Date of Patent: Dec. 30, 2025

(54) STEREOSCOPIC IMAGE DISPLAY DEVICE

(71) Applicant: INTERMAN CORPORATION, Kagoshima (JP)

(72) Inventors: Shigeki Uetabira, Kagoshima (JP); Mitsugu Uetabira, Kagoshima (JP); Naofumi Higashikawauchi, Kagoshima (JP); Yoshimasa Saitoh, Machida (JP)

(73) Assignee: INTERMAN Corporation, Kagoshima (JP)

(*) Notice: Subject to any disclaimer, the term of this patent is extended or adjusted under 35 U.S.C. 154(b) by 0 days.

(21) Appl. No.: 19/070,712

(22) Filed: Mar. 5, 2025

(65) Prior Publication Data

US 2025/0286988 A1    Sep. 11, 2025

(30) Foreign Application Priority Data

Mar. 8, 2024  (JP) ................. 2024-035806

(51) Int. Cl.
*H04N 13/366* (2018.01)
*G09G 3/36* (2006.01)
*H04N 13/393* (2018.01)
*H04N 13/398* (2018.01)

(52) U.S. Cl.
CPC ......... *H04N 13/366* (2018.05); *H04N 13/393* (2018.05); *H04N 13/398* (2018.05); *G09G 3/36* (2013.01)

(58) Field of Classification Search
CPC .. H04N 13/366; H04N 13/393; H04N 13/398; G09G 3/36
USPC .......................................................... 348/51
See application file for complete search history.

(56) References Cited

U.S. PATENT DOCUMENTS

| | | | |
|---|---|---|---|
| 6,972,756 B1* | 12/2005 | Yamamoto | A63F 13/219 463/2 |
| 2008/0013050 A1* | 1/2008 | Boute | H04N 7/144 348/E7.08 |
| 2008/0049151 A1* | 2/2008 | Vrachan | G02B 30/56 348/744 |
| 2011/0007390 A1* | 1/2011 | Yanamoto | H04N 13/324 359/466 |
| 2014/0306963 A1 | 10/2014 | Sun et al. | |
| 2024/0253465 A1* | 8/2024 | Shintani | G02B 27/0093 |

FOREIGN PATENT DOCUMENTS

| | | |
|---|---|---|
| JP | 2008-146221 A | 6/2008 |
| JP | 2014-534656 A | 12/2014 |
| JP | 2017-135543 A | 8/2017 |

* cited by examiner

*Primary Examiner* — Dave Czekaj
(74) *Attorney, Agent, or Firm* — Maier & Maier, PLLC

(57) ABSTRACT

A stereoscopic image display device includes a display device, a camera that detects the position of the user's viewpoint looking at this display device, and a rotation device that rotates the display device around a rotation axis passing through its display surface. This rotation device rotates the display device in synchronization with the movement of the user's viewpoint position so that the direction of the user's viewpoint as seen from the display surface does not change. A three-dimensional object defined in a world coordinate system that remains stationary relative to the real world is displayed on the display device, and when the user's viewpoint moves, an image of the object as seen from the direction of the user's viewpoint is displayed on the display device.

3 Claims, 6 Drawing Sheets

STEREOSCOPIC IMAGE DISPLAY DEVICE

CROSS-REFERENCE TO RELATED APPLICATIONS

The present application claims priority under 35 U.S.C. § 119 to Japanese Patent Application No. P2024-035806, filed on Mar. 8, 2024 including description, claims, drawings, and abstract. The contents of this application are herein incorporated by reference in their entirety.

FIELD

The present invention relates to a stereoscopic image display device that effectively utilizes motion parallax.

BACKGROUND

An aerial image display device is a device that displays a two-dimensional image in an empty space, and a stereoscopic display device is a device that displays stereoscopic information.

Technically, the two are independent concepts. However, when displayed as an aerial image by an aerial image display device, the image appears to float, creating a sense of stereoscopic depth. On the other hand, in a stereoscopically displayed image, a similar sense of floating as in an aerial image may be felt.

Simply speaking of stereoscopic vision, various factors are considered. One of the typical factors is binocular parallax. It has been clarified that nerve cells that react to binocular parallax exist in multiple visual areas, and the relative distance between the point of fixation and the object is estimated. This allows depth information to be obtained.

Furthermore, even with a two-dimensional image displayed on a normal display, a sense of depth and stereoscopic effect can be perceived due to factors such as perspective, object occlusion, shading, and texture. That is, a virtually three-dimensionally constructed space is created within a computer, and a stereoscopic image is displayed as viewed from a defined viewpoint. Even if the display is two-dimensional, it is possible to express the depth of objects, add shadows, or add highlights to express images as if they were three-dimensional.

As a technology for realizing stereoscopic vision, in addition to the use of binocular parallax, there is also the use of motion parallax. Motion parallax refers to the visual change in which the visible range of an object and the relative positions between objects change depending on the movement of the object or the movement of the observation position. From this change, it is possible to obtain the relative front-back positional relationship and depth information between objects.

For example, when an object displayed on a two-dimensional display in 3D graphics is moved or rotated on the screen, a greater sense of stereoscopic depth is obtained, which is due to motion parallax. Technologies for obtaining 3D information from motion parallax information included in 2D video have also been proposed (see PCT Published Japanese Translation No. 2014-534656 and Japanese Patent Published Application No. 2017-135543).

As a method of using such motion parallax for image display, a technology has also been proposed that detects the movement of the user's viewpoint with respect to the display, reproduces the video visible from the user, and displays it on the display, thereby creating a sense of stereoscopic vision (see Japanese Patent Published Application No. 2008-146221). However, in conventional displays implementing motion parallax, the display screen is obliquely viewed from an angle due to the movement of the user's viewpoint, making it impossible to obtain a natural stereoscopic effect.

Therefore, it is an object of the present invention to provide a stereoscopic image display device that can obtain a natural stereoscopic effect as if an object is actually present in space by more effectively utilizing motion parallax.

SUMMARY

To achieve at least one of the above-mentioned objects, reflecting one aspect of the present invention, a stereoscopic image display device comprises: a display device having a screen; a camera provided in front of the display device to detect the position of a viewpoint of a user who is viewing the display device; a rotation device which rotates the display device around a rotation axis; and an information processing device connected to the display device, the camera and the rotation device to receive the position of the viewpoint of the user and turn the display device by driving the rotation device responsive to movement of the viewpoint in order not to change the direction of the viewpoint relative to the screen of the display device, wherein the information processing device controls the display device to display a three-dimensional object which is defined on a world coordinate system which is fixed relative to the real world even when the display device rotates, and wherein when the viewpoint is moved, the information processing device controls the display device to display an image of the three-dimensional object as viewed from the moved viewpoint.

In accordance with one embodiment, the display device is an aerial image display device capable of displaying a two-dimensional image in an empty space.

Furthermore, in accordance with one embodiment, the aerial image display device is equipped with a retro-transmissive optical imaging element.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Hereafter, with reference to the accompanying drawings, embodiments of the stereoscopic image display device according to the present invention will be described. In the following embodiments, aerial image display devices equipped with retro-transmissive optical imaging elements are shown as implementation examples of the stereoscopic image display device according to the present invention.

Embodiment 1

Structure of the Aerial Image Display Device

Figure 1:
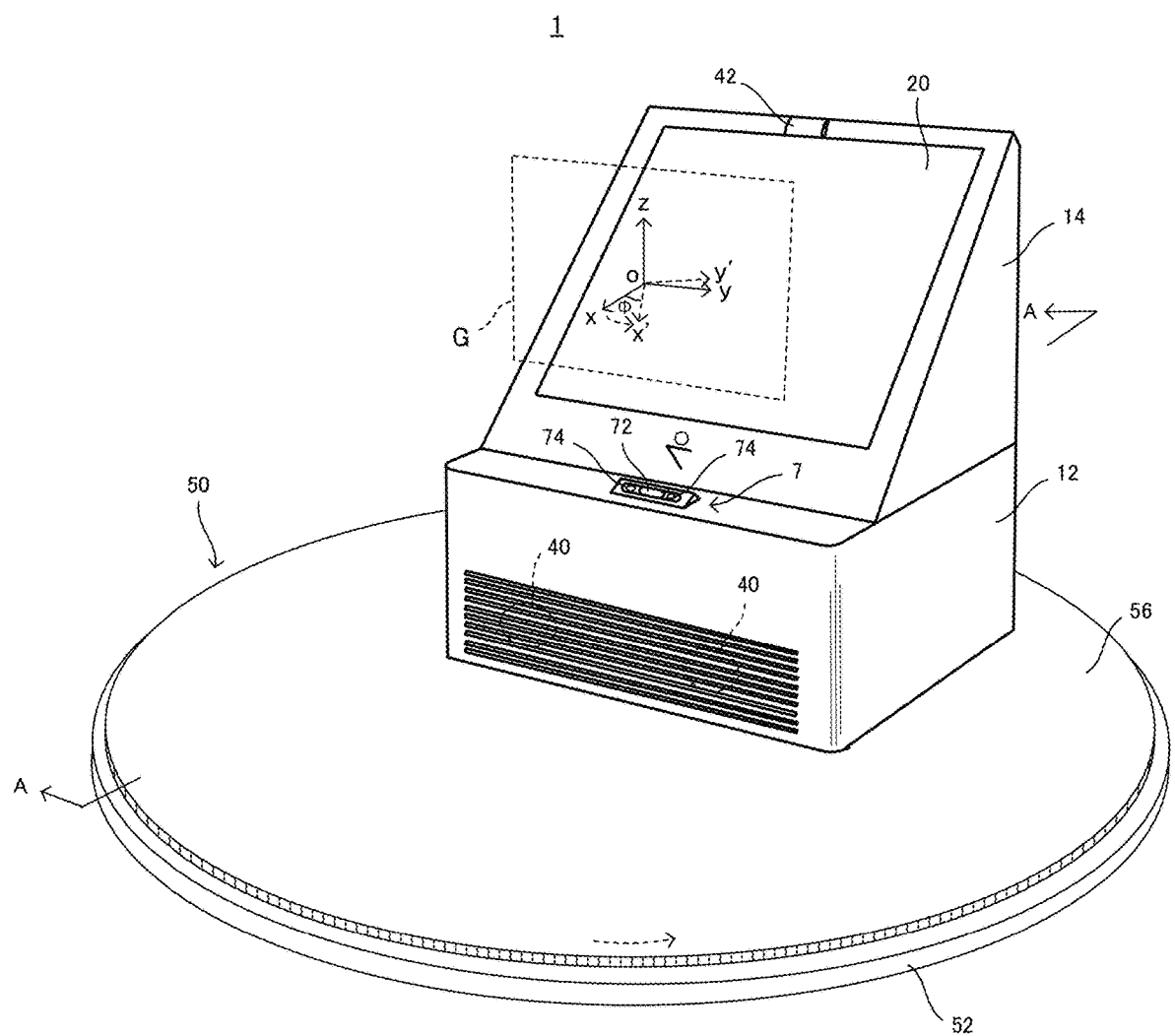
FIG. 1 is a perspective view showing an aerial image display device 1 as a stereoscopic image display device according to Embodiment 1 of the present invention.
Figure 2:
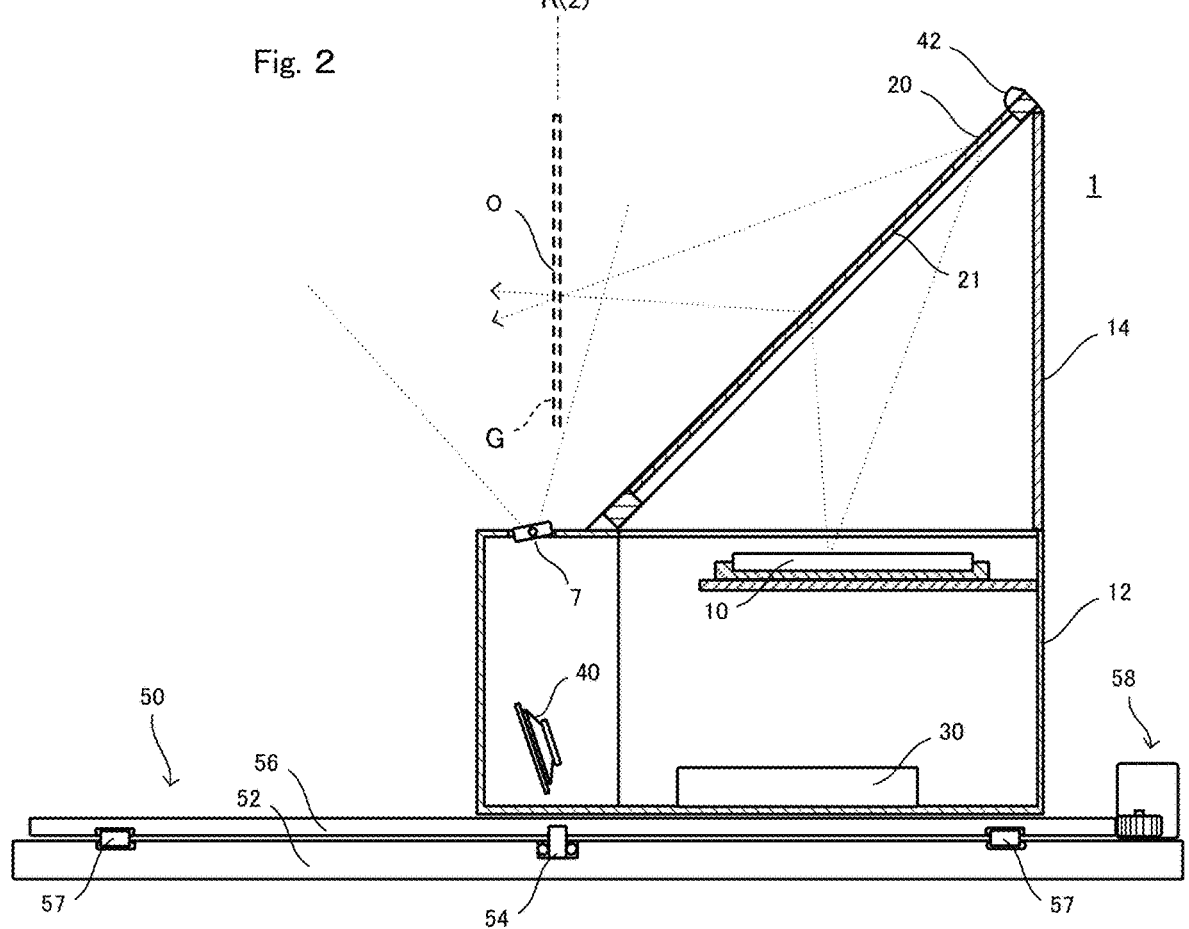
FIG. 2 is a cross-sectional view along line A-A in FIG. 1, showing the aerial image display device 1 in use.

FIG. 1 is a perspective view showing an aerial image display device 1 as a stereoscopic image display device according to Embodiment 1 of the present invention. FIG. 2 is a cross-sectional view along line A-A in FIG. 1, showing the aerial image display device 1 in use.

As shown in FIGS. 1 and 2, the aerial image display device 1 essentially includes a liquid crystal display 10 and an optical plate 20 as indispensable components. Additionally, the aerial image display device 1 is equipped with an information processing device 30 that controls the liquid crystal display 10, and speakers 40. Here, the liquid crystal display 10, the speakers 40, and the information processing device 30 are housed inside a lower casing 12 and connected to each other by signal lines (omitted in the figure).

The information processing device 30 is essentially a small computer consisting of a CPU (Central Processing Unit), ROM (Read Only Memory), RAM (Random Access Memory), a storage device for storing various programs and data, input/output interfaces, etc. The input/output interfaces may include, for example, USB ports or wireless LAN such as WiFi. The information processing device 30 outputs video signals to the liquid crystal display 10 to display a screen image which is projected as an aerial image. Also, the information processing device 30 outputs audio signals to the speakers 40 to produce guidance voices, sound effects or the like. As this information processing device 30, a commercially available product can be utilized such as a general-purpose small personal computer or a general-purpose tablet.

The liquid crystal display 10 is housed in the lower casing 12 that is rectangular in plan view with an open top, and is supported almost horizontally with its display screen facing upward. The optical plate 20 is fitted into the upper casing 14 with its incident surface 21 facing downward, angled diagonally opposite to the display screen of the liquid crystal display 10. Here, the optical plate 20 and the liquid crystal display 10 are fixed at an angle of approximately 45 degrees.

The optical plate 20 can be a retro-transmissive optical imaging element (transmissive dihedral corner reflector array) as described in Japanese Patent Published Application No. 2011-175297. This optical imaging element is achieved by arranging numerous light-reflecting planes orthogonal to each other in a regular pitch. Alternatively, a structure such as the two-sided corner reflector with reflective surfaces formed on the sides of square holes, as described in Japanese Patent No. 4900618, can also be used.

The upper casing 14 that constitutes the aerial image display device 1 is designed to be easily detachable from the lower casing 12. By removing the upper casing 14, maintenance and adjustment of the interior of the lower casing 12 can be easily performed, and the height can be reduced for transportation.

As shown in FIG. 2, the light from the display screen of the liquid crystal display 10 enters the optical plate 20, reflects twice within the optical plate 20, and exits from the opposite side. As a result, with the optical plate 20 as a symmetrical surface, an aerial image G is formed or projected as a real image in the space on the opposite side. Namely, an aerial imaging system is implemented with the optical plate 20 and the liquid crystal display 10. In this case, in order to realize a clearer aerial image G, it is preferable to prevent external light from mixing with the light from the liquid crystal display 10.

Note that the aerial image G shown here illustrates the image area displayed in the air when an image is displayed on the entire display screen of the liquid crystal display 10. If a three-dimensional object is displayed in the center of the display screen of the liquid crystal display 10 and nothing is displayed in other areas (set to black), only the three-dimensional object will be displayed in the air. Therefore, in the following explanation, the term "aerial image area G" is often used instead of aerial image G. Since the optical plate 20 and the liquid crystal display 10 are fixed at an angle of 45 degrees, the aerial image area G is in an upright position as the upright screen of the aerial image display device 1. Typically, since the display screen of the liquid crystal display 10 is rectangular, the aerial image area G is also rectangular. In this specification, the aerial image area G is referred to also as the display surface of the aerial image display device 1.

Furthermore, a 3D motion sensor 7 consisting of an infrared LED 72 and a pair of infrared cameras 74 is installed on the front side of the lower casing 12. This motion sensor 7 precisely detects the user's hand movements in three dimensions. The detection range of the motion sensor 7 is determined by the emission angle of the infrared LED 72 and the viewing angle of the infrared cameras 74. Such a motion sensor 7 can be a commercially available product, such as the Leap Motion Controller 2 sold by Ultraleap Ltd.

In particular, this three-dimensional motion sensor 7 is mounted so that its tilt angle can be adjusted. That is, the motion sensor 7 is housed in a mounting unit that can rotate within a certain angle range (here, ±20 degrees) around an axis perpendicular to the cross-sectional plane of FIG. 2. In this case, the center of the detection range of the motion sensor 7 is adjusted to be shifted toward the user from the center of the aerial image G. This adjustment maximizes the effective operation detection range.

Traditionally, such aerial image display devices are often used as input devices for administrative systems like reception systems. In other words, if a contactless interface screen is displayed as the aerial image G, the user can operate the interface using gestures, such as touching it with their fingers. The motion sensor 7, consisting of the infrared LED 72 and infrared cameras 74, detects these operations, and the corresponding operation signals are transmitted to the information processing device 30, where predetermined processing is performed. The operation interface includes controls such as buttons, checkboxes, and dropdown menus. Thus, it is possible to achieve a fully contactless interface with the same ease of use as a conventional touch panel.

Additionally, the aerial image display device 1 is placed on an electrically driving turntable 50, allowing 360-degree free rotation around a rotation axis R that vertically penetrates the center of the aerial image area G (the center of both the width and height of the region). Specifically, the turntable 50 consists of a support base 52, a rotating plate 56 on this support base 52 to rotate around a rotation shaft 54, rollers 57 that rotatably support this rotating plate 56 on the support base 52, and a drive device 58 that rotates this rotating plate 56. Thus, the turntable 50 serves as a rotation device that rotates the aerial image display device 1 placed on it.

The drive device 58 communicates with the information processing device 30 wirelessly or via a communication cable (not shown in the figure). The drive device 58 rotates the rotating plate 56 around the rotation shaft 54 based on control signals from the information processing device 30, and calculates the rotation angle of the rotating plate 56 to transmit the calculated rotation angle to the information processing device 30.

Specifically, the drive device 58 is equipped with a motor having an encoder, which rotates the rotating plate 56 around the rotation shaft 54 and calculates the rotation angle of the rotating plate 56. The drive device 58 performs servo control to accurately control the rotation of the aerial image display device 1.

Furthermore, a face detection camera 42 is installed above the optical plate 20. This face detection camera 42 captures the user's face from the front direction of the aerial image display device 1 and detects the three-dimensional position of the user's eyes. As such a face detection camera 42, a 3D camera equipped with a depth sensor can be used. For example, Kinect (registered trademark) can be used as the face detection camera 42.

Therefore, a face detection algorithm for detecting faces and further identifying eye positions from the captured images by the face detection camera 42 is incorporated into the information processing device 30. For example, YOLO (You only look once), a popular deep learning library which enables real-time processing, can be used as the face detection algorithm. This allows detection of whether the user's viewpoint is shifted to the left or right from the center of the aerial image display device 1.

Although not shown in the figure, the aerial image display device 1 and the turntable 50 are placed on a table of appropriate height so that the aerial image can be viewed at eye level. Particularly, it is desirable to use a table with an attached lifting device that allows free height adjustment. An example of such a lifting device is an electric lifting device named "Mario N" sold by Yamato Metal Manufacturing Co., Ltd.

[Coordinate System]

Here, the coordinate systems used in this embodiment are defined. The coordinate systems include world coordinates, camera coordinates, and device coordinates. These definitions are almost the same as the general use of conventional coordinate systems, but there are some extensions and modifications for explanatory purposes.

First, the world coordinate system will be explained. Generally, the term world coordinate system refers to a coordinate system that defines the entire immovable 3D space on a computer, but in this specification, we use this definition in a more extended way. That is, if the computer itself rotates, the 3D space on the computer would rotate with it. However, in this specification, the world coordinate system remains more absolutely stationary.

In other words, even if the computer (aerial image display device 1) itself rotates, the world coordinate system does not rotate and remains immobile relative to the external real world. Therefore, when the aerial image display device 1 rotates, other coordinate systems rotate relative to the external real world, but the world coordinate system does not move. Conversely, from the perspective of the aerial image display device 1, the world coordinate system relatively rotates in the opposite direction by the amount of rotation detected of the rotating plate 56.

The world coordinate system is right-handed, and as shown in FIG. 1, the up-down direction is the z-axis, the left-right direction is the y-axis, and the front-back direction (depth direction) is the x-axis, expressed as (x, y, z). The origin O is on the axis of the rotation shaft 54 of the rotating plate 56. In this description, for explanatory purposes, the center of the aerial image area G (the center of both the width and height of this region) is set as the origin O.

Next, the device coordinate system will be explained. The device coordinate system used here is a coordinate system on the display screen. Specifically, this coordinate system indicates the position on the aerial image area G as the display screen. The position is represented as a three-dimensional coordinate system (x', y', z') also with an axis in the normal direction of the display screen. The y' axis and y' axis are on the horizontal plane. The z' axis is vertical. The device coordinate system (x', y', z') rotates with the rotation of the rotating plate 56, but at the base position of the rotating plate 56, the device coordinate system (x', y', z') is assumed to coincide with the world coordinate system (x, y, z).

Next, the camera coordinate system will be explained. This is a three-dimensional coordinate system with the face detection camera 42 as the origin. This embodiment uses the coordinate values of the viewpoint (here, the position at the center of the line segment connecting the left and right eyes) by converting the camera coordinate values of the center position of the user's left and right eyes detected by the face detection camera 42 to values in the coordinate system of the aerial image area G (device coordinate system (x', y', z')). This can be done through affine transformation.

Figure 3:
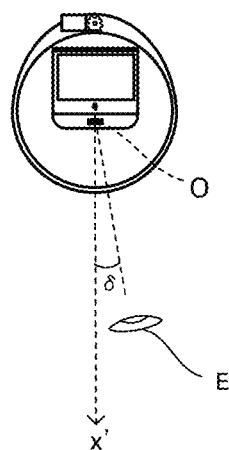
FIG. 3 is an explanatory diagram showing how a user's viewpoint moves relative to the aerial image display device 1 in Embodiment 1 of the present invention.

The position of this user's viewpoint is used to calculate the horizontal angle δ of the user's viewpoint relative to the front direction of the aerial image display device 1 (the direction normal to the aerial image area G) (see FIG. 3). This is calculated as δ=a tan (y'/x'), where (x', y', z') is the coordinate of the viewpoint in the device coordinate system. This angle δ is transmitted to the information processing device 30, and the information processing device 30 rotates the rotating plate 56 around the rotation shaft 54 by servo control to make this angle δ zero.

[Method of Implementing Three-Dimensional Images]

In what follows, referring to the figures, the method of displaying three-dimensional images using the aerial image display device 1 will be explained. First, the object to be displayed in the aerial image area G is modeled as a three-dimensional image in the world coordinate system. While the aerial image display device 1 rotates as described above, the object is defined in the world coordinate system and its position is determined relative to the real world (for example, the room where the aerial image display device 1 is installed) regardless of the rotation of the aerial image display device 1. For the sake of clarity in explanation, a cube is used as an example of the object and assumed to be stationary in the world coordinate system. Needless to say, the present invention is applicable to an arbitrary three-dimensional object other than a cube.

Figure 4:
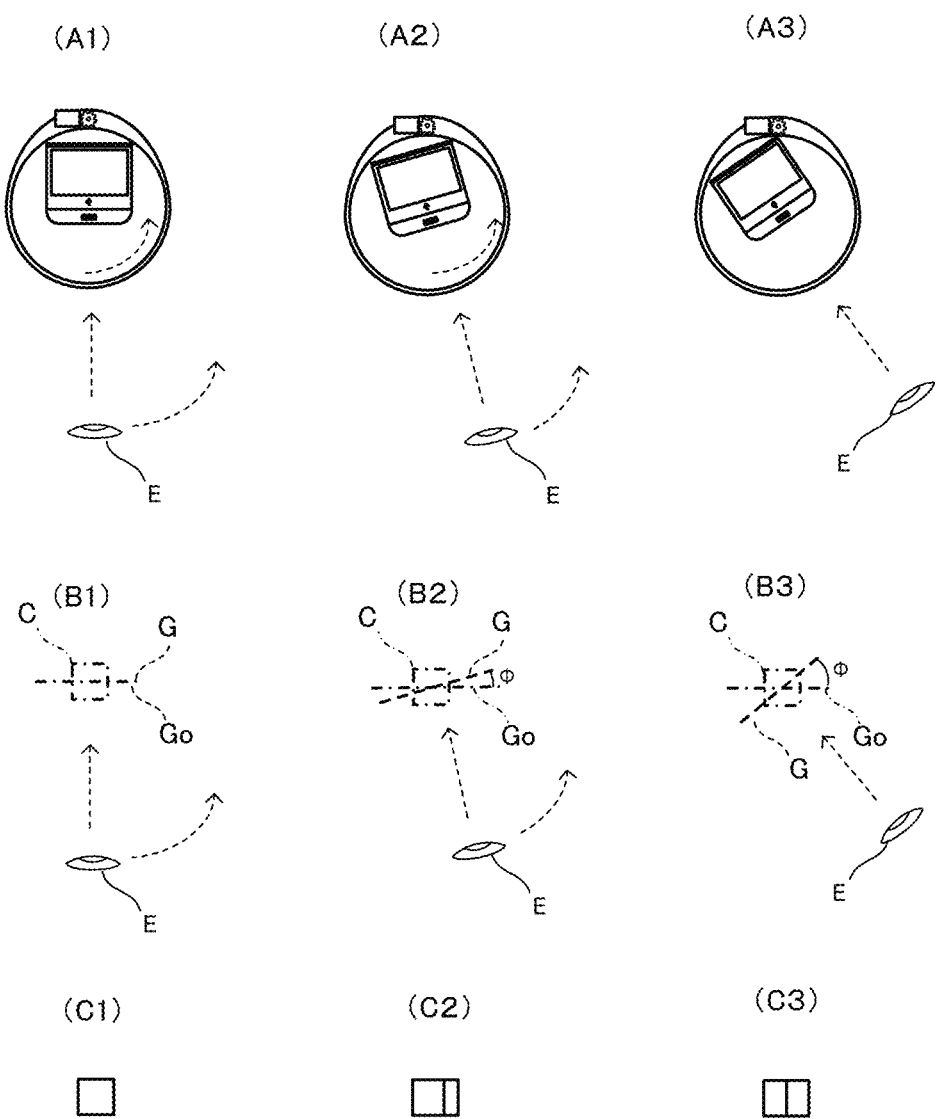
FIG. 4 explains how the aerial image display device 1 of Embodiment 1 of the present invention operates, in which (A1), (A2), and (A3) are plan views showing the aerial image display device 1 as seen from above; (B1), (B2), and (B3) are diagrams explaining how a three-dimensional object is displayed by the aerial image display device 1 corresponding to (A1), (A2), and (A3); and (C1), (C2), and (C3) are diagrams showing the images displayed as aerial images in the aerial image area G by the aerial image display device 1 corresponding to (A1), (A2), and (A3).

(A1), (A2), and (A3) of FIG. 4 are plan views of the aerial image display device 1 seen from above. In FIG. 4 (A1), the user's viewpoint E is positioned directly in front of the aerial image display device 1 in its base position. Here, as shown in FIG. 2, the base position of the aerial image display device 1 is set where the back of the aerial image display device 1 is facing the drive device 58.

When the user moves slightly to the right and the viewpoint E moves to the right side from the front of the aerial image display device 1, the face detection camera 42 detects this movement (angle δ) and transmits (notifies) the movement to the information processing device 30. Then, the information processing device 30 controls the drive device 58 to rotate the aerial image display device 1, following the movement of the user's viewpoint E so that the moved user's viewpoint E is positioned in front of the aerial image display device 1.

In other words, the rotating plate 56 is rotated around the rotation shaft 54 to keep the angle δ (=a tan (y'/x')) between the front direction of the aerial image display device 1 and the direction of the user's viewpoint as seen from the rotation axis R at zero. As a result, the rotation angle Φ (refer to FIG. 1) of the aerial image display device 1 relative to the base position is always determined in synchronization with the movement of the user's viewpoint E, and the user always faces the front of the aerial image display device 1 ((A2) and (A3) of FIG. 4).

(B1), (B2), and (B3) of FIG. 4 correspond to (A1), (A2), and (A3) of FIG. 4 respectively, and are diagrams explaining how the aerial image is displayed by the aerial image display device 1. In the figures, the reference symbol C indicates a cube, but this is just for convenience to show the object of the three-dimensional image display and is not the actual displayed image. The actual images displayed as aerial images in the aerial image area G are shown in (C1), (C2), and (C3) of FIG. 4.

The dashed line indicated by the reference symbol G represents the aerial image area projected from the display screen of the liquid crystal display 10. (C1), (C2), and (C3) of FIG. 4 are projection images of the cube C, which is stationary in the world coordinate system, onto the aerial image area G as seen from the user's viewpoint E.

In FIG. 4 (B1), the aerial image display device 1 is in the base position, and the aerial image area at this time is indicated by the reference symbol Go. Meanwhile, the user's viewpoint E is on the normal line of the aerial image area Go in the base position. In this case, as shown in FIG. 4 (C1), only the front face of the cube C is displayed.

When the user's viewpoint E moves to the right as shown in FIG. 4 (B2), the aerial image display device 1 rotates, and the aerial image area G follows to face the user's viewpoint E. The rotation angle Φ of the aerial image area G relative to the aerial image area Go in the base position is illustrated. In this case, as shown in the projection image in FIG. 4 (C2), a small part of the right side of the cube C is displayed.

As shown in FIG. 4 (B3), when the user's viewpoint E moves further to the right, the aerial image display device 1 rotates further in synchronization. For example, when the rotation angle Φ becomes 45 degrees, as shown in FIG. 4 (C3), the projection image of the cube C is displayed so that the front and right sides are visible to a similar extent.

Needless to say, the aerial image area G is not visible to the user, and only the display object (in this case, the cube) appears to be floating in the air. If you want to see the side of the display object, you can shift your viewpoint to the side, revealing sides that were not visible before. This allows for an experience similar to having the display object actually present there.

Accordingly, motion parallax, which occurs when the observer's viewpoint moves, is implemented. This results in a motion depth effect, allowing the user to perceive the display object three-dimensionally.

Embodiment 2

In Embodiment 1 as described above, the aerial image display device 1 rotates to follow the moving user's viewpoint E, always positioning the user's viewpoint E in front of the device. However, since the aerial image display device 1 rotates mechanically, it is difficult to perfectly synchronize the user's viewpoint E with the front of the device. Depending on the drive device 58's capabilities, the angle δ in FIG. 3, which ideally should be close to zero, may become noticeable.

Additionally, implementing motion parallax for vertical movement of the user's viewpoint E would provide a more realistic sense of presence. Implementing this vertical motion parallax mechanically would require rotating the aerial image display device 1 around the y' axis in the above coordinate system, but this would be costly and make the entire device large-scale.

Therefore, in Embodiment 2, the angle δ in FIG. 3 is corrected, which is the deviation between the user's viewpoint E and the front of the aerial image display device 1, by using software. The specific method is explained below. For the sake of clarity in explanation, only the horizontal movement of the user's viewpoint E will be initially considered.

Figure 5:
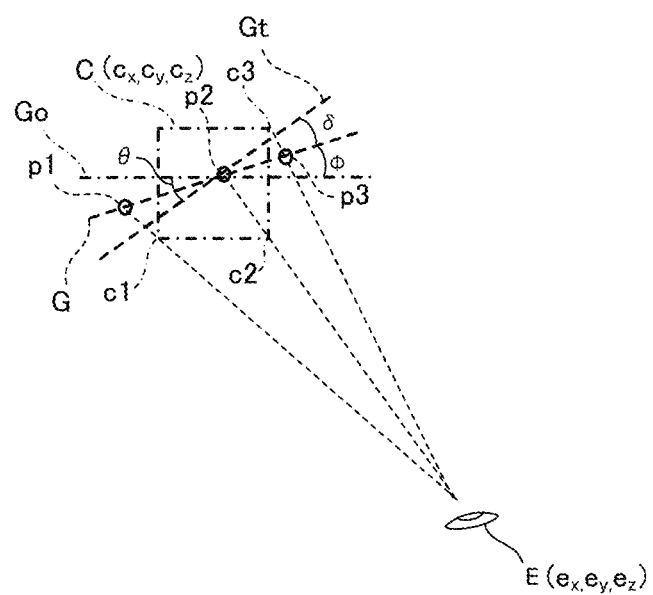
FIG. 5 is a diagram explaining the perspective projection transformation performed in the aerial image display device 1 according to Embodiment 2 of the present invention.

In the explanatory diagram of FIG. 5, when the user's viewpoint E shifts horizontally by angle θ relative to the stationary cube C in the world coordinate system, the aerial image display device 1 rotates to follow it. Ideally, the angle of the aerial image area G relative to the base position aerial image area Go should be θ (denoted by Gt), but due to mechanical rotation delay, it becomes a smaller angle Φ. In other words, it deviates by angle δ (=θ−Φ).

If the cube C were drawn in the aerial image area G assuming the user's viewpoint E is at angle θ, it would be viewed at an angle to the aerial image area G, distorting the displayed image and diminishing the sense of three-dimensionality. Therefore, a transformation is performed that results in the correct oblique view only when viewed from an angle. This aims to create an optical illusion effect similar to what's called an image hump in road markings. The details are explained below.

When the user's viewpoint E is directly in front of the aerial image area G, using the device coordinates (y', z') for the projection plane (aerial image area G), the user's viewpoint E is positioned on the normal direction x'. However, due to the delay in the rotation of the aerial image display device 1, the user's viewpoint E is not on the normal direction x' of the projection plane (aerial image area G) during rotation.

Therefore, a perspective projection transformation of the cube C is performed from the user's viewpoint E to the angled aerial image area G using the device coordinates. In the device coordinates, let the coordinates of the user's viewpoint E be (ex, ey, ez) and the coordinates of the cube C be (cx, cy, cz). If the point where the line connecting these two points intersects the projection plane (y'z' plane) is (px, py, pz), then py and pz can be calculated as follows (px is always 0):

$$py = (cy \cdot ex - cx \cdot ey)/(ex - cx)$$

$$pz = (cz \cdot ex - cx \cdot ez)/(ex - cx)$$

FIG. 5 illustrates how the edges c1, c2, and c3 of the cube C are projected onto points p1, p2, and p3 on the projection plane. Since the projection plane is the aerial image area G, it can be directly output as the display image for the liquid crystal display 10. Normally, as displayed objects are opaque, hidden lines and surfaces are removed through hidden surface processing. Also, needless to say, the coordinate system of the display device often has its origin in the top-left corner, and measurement unit adjustments are necessary, so the output image will undergo appropriate transformations.

By correcting the mechanical rotation delay with software in this way, the object appears to move smoothly to the user's eyes, allowing for a more natural and three-dimensional recognition of the object's shape. In the above explanation, the software correction (the perspective projection transformation formula) is not limited to the horizontal direction, and motion parallax in the vertical and depth directions, which occurs when the observer's viewpoint moves in these directions, is also implemented through the optical illusion effect. Of course, this implementation is within the range of viewing angles for vertical and depth directions. This enables a more effective experience of motion depth perception.

Embodiment 3

In Embodiment 2, motion parallax is implemented by combining software correction with the mechanical rotation of the aerial image display device 1, but it is possible to implement motion parallax with software correction alone. However, since retro-transmissive or retro-reflective systems have narrow viewing angles, the range where the three-dimensional image can be viewed is limited with software correction alone.

Therefore, in this Embodiment 3, motion parallax is implemented by using only software correction on an aerial image display device with an expanded viewing angle.

Figure 6:
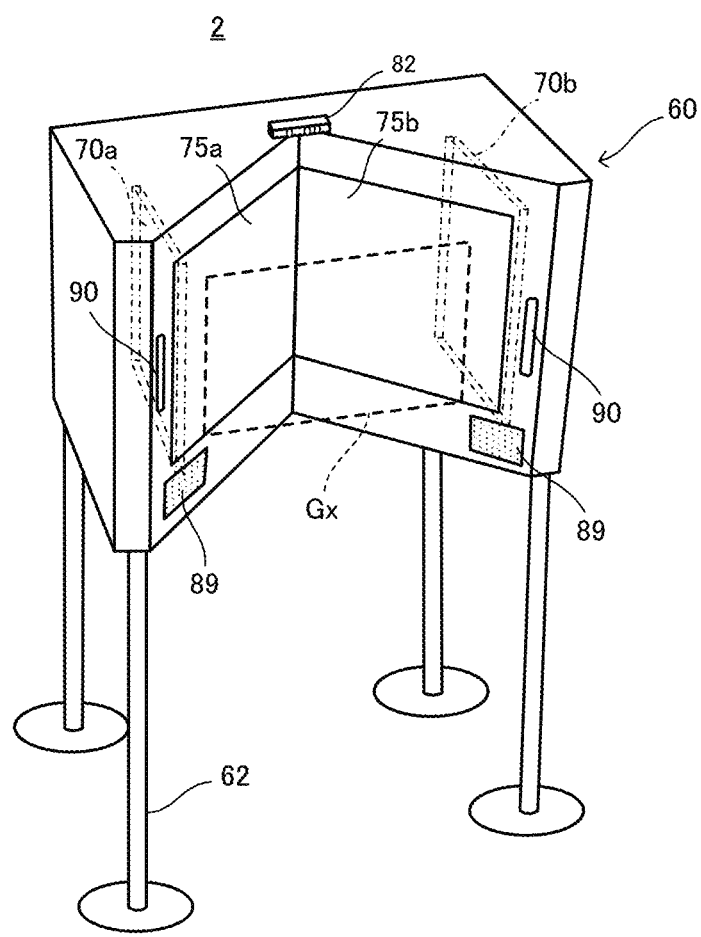
FIG. 6 is a perspective view showing an aerial image display device 2 as a stereoscopic image display device according to Embodiment 3 of the present invention.

FIG. 6 is a perspective view showing an aerial image display device 2 as the stereoscopic image display device of Embodiment 3. This aerial image display device 2 consists of an M-shaped cross-section casing 60, a pair of liquid crystal displays 70*a* and 70*b* installed parallel to each other on the inside of the left and right side surfaces of this casing 60, a pair of optical plates 75*a* and 75*b* installed at a 45-degree angle to these left and right liquid crystal displays 70*a* and 70*b* respectively, motion sensors 90 for operation detection installed on the outside of the optical plates 75*a* and 75*b*, a face detection camera 82 installed on the top of the casing 60, speakers 89, and a control device (not shown in the figure) that processes input and output signals of these components. Also in this example, the motion sensors 90 consist of infrared LEDs and infrared cameras. The functions of the motion sensors 90 and face detection camera 82 are the same as those of the motion sensor 7 and face detection camera 42 in Embodiment 1, so their explanation will not be repeated.

This aerial image display device 2 is designed to be viewed while standing. Since the vertical viewing angle of the aerial image display device 2 is not expanded, it is desired that the casing 60 is supported by legs 62 so that the position of the aerial image is about eye level.

The optical plates 75*a* and 75*b* are each of the same rectangular shape and are placed with their adjacent one edges being in contact at a certain angle (90 degrees in this case). However, the pair of liquid crystal displays 70*a*, 70*b* and the pair of optical plates 75*a*, 75*b* are each standing vertically on the left and right. As viewed from above, the liquid crystal displays 70*a*, 70*b* and optical plates 75*a*, 75*b* are symmetrically arranged with respect to the plane that passes through the joint edge of the optical plates 75*a*, 75*b* and bisects the angle between them.

Accordingly, the display screen of the liquid crystal display 70*a* forms a real image in a position symmetrical across the optical plate 75*a*, and the display screen of the liquid crystal display 70*b* forms a real image in a position symmetrical across the optical plate 75*b*. These two real images partially overlap on the same plane, forming a single aerial image area Gx. However, the liquid crystal displays 70*a* and 70*b* are controlled to display the screen images thereof in order that the overlapping parts of the two real images (the central part of the single aerial image area Gx) are identical and exactly aligned. This expands the aerial image area Gx compared to conventional aerial image areas, resulting in a significantly larger viewing angle.

An object is displayed in this aerial image area Gx in the same way as in Embodiment 2. When the user's viewpoint moves, the above perspective projection transformation is performed on the object and displayed in the aerial image area Gx. This implements an optical illusion effect where the object is correctly perceived three-dimensionally even when viewed from an angle.

Therefore, it is possible to effectively experience motion depth perception with a wide horizontal viewing angle without physically rotating the aerial image display device 2. As in Embodiment 2, motion parallax is also implemented within the range of the vertical viewing angle.

Embodiment 4

Figure 7:
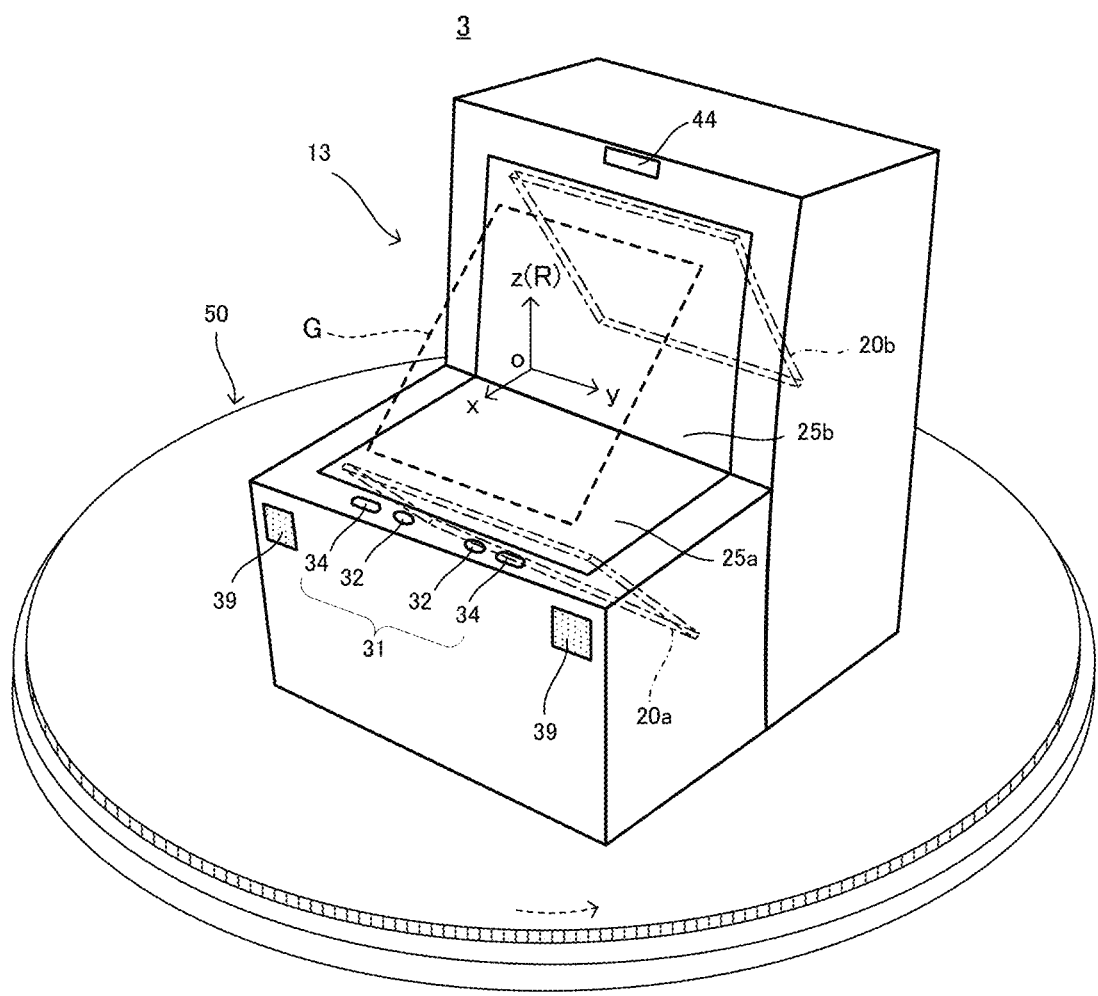
FIG. 7 is a perspective view showing an aerial image display device 3 as a stereoscopic image display device according to Embodiment 4 of the present invention.

In Embodiment 4, motion parallax is implemented in both vertical and horizontal directions by combining an expanded vertical viewing angle with mechanical rotation. FIG. 7 is a perspective view showing an aerial image display device 3 that constitutes the stereoscopic image display device of Embodiment 4 of the present invention.

As shown in FIG. 7, the aerial image display device 3 comprises a chair-shaped housing 13, a pair of liquid crystal displays 20*a* and 20*b* installed at an angle of about 45 degrees to the horizontal plane inside the housing, a pair of optical plates 25*a* and 25*b* placed horizontally and vertically on the seat and backrest portions of the chair-shaped housing 13 respectively, a motion sensor 31 for operation detection placed in front of the optical plate 25*a*, speakers 39, and a control device (not shown) that processes input and output signals of these various elements. The motion sensor 31 consists of a pair of infrared LEDs 32 and a pair of infrared cameras 34.

The pair of liquid crystal displays 20*a*, 20*b* and the pair of optical plates 25*a*, 25*b* are essentially the same as the liquid crystal displays 70*a*, 70*b* and optical plates 75*a*, 75*b* of the aerial image display device 2 shown in FIG. 6, but rotated 90 degrees vertically while maintaining their relative positions. In other words, the optical plates 25*a* and 25*b* are of the same rectangular shape, with their adjacent one edges being in contact at a certain angle (90 degrees in this case). The liquid crystal displays 20*a* and 20*b* are positioned facing the optical plates 25*a* and 25*b* at a predetermined angle (45 degrees in this case). Overall, the liquid crystal displays 20*a*, 20*b* and the optical plates 25*a*, 25*b* are symmetrically arranged with respect to the plane that passes through the joint edge of the optical plates 25a, 25b and bisects the angle between them.

Accordingly, the display screen of the liquid crystal display 20a forms a real image in a position symmetrical across the optical plate 25a, and the display screen of the liquid crystal display 20b forms a real image in a position symmetrical across the optical plate 25b. As in the aerial image display device 1 of Embodiment 1, the display image of the liquid crystal display 20a and the display image of the liquid crystal display 20b partially overlap on the same plane, forming a single aerial image area G which is tilted by 45 degrees from the horizontal plane. The overlapping part of the two real images shows the same image. This achieves extension of the vertical viewing angle by the non-overlapping part.

The infrared LEDs 32 and infrared cameras 34 of the motion sensor 31 capture the user's hand near the aerial image region G to detect the position and movement of the user's hand, similar to Embodiment 2. A face detection camera 42 is also installed on the top of the housing 13, which captures the user's face from the front of the aerial image display device 3 to detect the three-dimensional position of the user's eyes, similar to Embodiment 2.

As in Embodiment 1, the aerial image display device 3 is placed on an electric turntable 50, allowing 360-degree free rotation around the rotation axis R that vertically passes through the center (the center of both width and height) of the aerial image region G. The structure of the turntable 50 is the same as in Embodiment 1.

The method of displaying stereoscopic images using the aerial image display device 3 is similar to Embodiment 1, so the details will not be repeated. In short, the information processing device controls the drive device of the turntable 50 to rotate the aerial image display device 3, following the movement of the user's viewpoint E so that the moved user's viewpoint is positioned in front of the aerial image display device 3.

The difference from Embodiment 1 is the expanded vertical viewing angle. Specifically, motion parallax in the horizontal direction is addressed by mechanical rotation of the aerial image display device 3, while motion parallax in the vertical direction is addressed by the expanded viewing angle.

Note that in Embodiment 1, the aerial image region G stands vertically, but in Embodiment 4, the aerial image region G is tilted by 45 degrees, resulting in an image that appears to be viewed from obliquely upward.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

The stereoscopic image display device according to the present invention realizes stereoscopic vision with unprecedented realism, enabling, for example, exhibitions of cultural assets such as sculptures and earthenware from 3D data as if the real objects were present.

The aerial image display device 1 has been described using a cube as an example of the object displayed thereon, assuming that the object is stationary in the world coordinate system. However, the present invention can be implemented even if the object undergoes arbitrary temporal changes (rotation, deformation, etc.) in the world coordinate system. For example, if the object is the Earth, the user can view a rotating Earth from various angles relative to the world coordinates.

Furthermore, while the above embodiments use an aerial image display device with a retro-transmissive optical imaging element, the present invention is not limited to this. For example, an aerial image display device using a retro-reflective optical imaging element can also be adopted.

Moreover, the gist of the present invention can be expected to have some effect even without necessarily using aerial images. Therefore, it is possible to implement the present invention using general displays such as liquid crystal displays or OLED displays in place of the aerial image display.

The invention claimed is:
1. A stereoscopic image display device comprising:
a display device having a screen;
a camera provided in front of the display device to detect the position of a viewpoint of a user who is viewing the display device;
a rotation device which rotates the display device around a rotation axis; and
an information processing device connected to the display device, the camera and the rotation device to receive the position of the viewpoint of the user and turn the display device by driving the rotation device responsive to movement of the viewpoint in order not to change the direction of the viewpoint relative to the screen of the display device,
wherein the information processing device controls the display device to display a three-dimensional object which is defined on a world coordinate system which is fixed relative to the real world even when the display device rotates, and
wherein when the viewpoint is moved, the information processing device controls the display device to display an image of the three-dimensional object as viewed from the moved viewpoint.
2. The stereoscopic image display device of claim 1, wherein the display device is an aerial image display device capable of displaying a two-dimensional image in an empty space.
3. The stereoscopic image display device of claim 2, wherein the aerial image display device is equipped with a retro-transmissive optical imaging element.

* * * * *